United States Patent [19]

Duecoffre et al.

[11] Patent Number: 5,480,936
[45] Date of Patent: Jan. 2, 1996

[54] EMULSIFIER-FREE COATING AGENT, MANUFACTURE AND USE THEREOF

[75] Inventors: Volker Duecoffre; Carmen Flosbach; Walter Schubert; Manfred Krumme; Werner Stephan, all of Wuppertal; Fritz Sadowski, Pulheim-Brauweiler, all of Germany

[73] Assignee: Herberts Gesellschaft mit beschranker Haftung, Wuppertal, Germany

[21] Appl. No.: 250,449

[22] Filed: May 27, 1994

[30] Foreign Application Priority Data

May 28, 1993 [DE] Germany .......................... 43 17 792.1

[51] Int. Cl.⁶ .............................. C08L 75/06; C08F 3/30; C08F 282/02
[52] U.S. Cl. .......................... 524/839; 524/591; 525/123; 525/453; 525/455
[58] Field of Search ..................... 525/123, 453, 525/455; 524/539, 591, 839

[56] References Cited

U.S. PATENT DOCUMENTS

| | | | |
|---|---|---|---|
| 5,308,912 | 5/1994 | Margotte et al. | 524/591 |
| 5,336,711 | 8/1994 | Schneider et al. | 524/591 |

FOREIGN PATENT DOCUMENTS 0247539  12/1985  Japan ..................... 525/123

*Primary Examiner*—Peter A. Szekely
*Attorney, Agent, or Firm*—Schweitzer Cornman & Gross

[57] ABSTRACT

Oligoester acrylate resins having a high content of solids and comparatively low viscosity, and aqueous coating agents with a low content of organic solvents for obtaining coatings with high resistance to chemicals, more particularly high resistance to acids and oily soot, and very low tendency to yellowing.

6 Claims, No Drawings

EMULSIFIER-FREE COATING AGENT, MANUFACTURE AND USE THEREOF

BACKGROUND OF THE INVENTION

The invention relates to a coating agent based on self-emulsifying copolymers, particularly based on polyester oligomer polyacrylate and neutralising agent, and cross-linked with polyisocyanates and optionally containing conventional lacquer additives such as pigments, fillers and/or organic solvents. The aqueous coating agent is of use for producing lacquer coats, particularly for multilayer lacquer coats in the form of base lacquer, preferably clear lacquer, filler and/or coating lacquer.

The construction of multilayer lacquer coats is known particularly in the motor-vehicle construction industry. Advantageously a clear-lacquer layer is applied "wet-on-wet" on to a base lacquer layer after brief drying, followed by simultaneous final setting.

The earlier, not previously-published German Patent Application P 42 23 183.3 describes aqueous emulsions based on acrylic copolymers which are synthesised in one or more low-molecular polyesters and then cross-linked with a mixture of melamine resins and masked polyisocyanates.

It is also known to use unmasked polyisocyanate compounds in an aqueous medium. For example, EP-A-0 358 979, DE-A-4 101 696 and DE-A-3 829 589 describe aqueous dispersions of polyhydroxy acrylate resins in which any "lacquer polyisocyanates" can be emulsified.

EP-A-0 496 205 describes an aqueous dispersion of a hydroxyfunctional polyester resin in which any polyisocyanate can be emulsified.

EP-A-0 206 059, EP-A-0 081 628, EP-A-0 310 345 and EP-A-0 019 844 describe emulsifiers for polyisocyanates and in the form of reaction products of polyisocyanates with hydrophilic polyalkylene ether alcohols. The aqueous polyisocyanate emulsions are used as accelerators for aqueous adhesives or moulded members.

DE-A-41 37 429 describes aqueous binder combinations containing a polyol component consisting of a mixture of at least two polyester resins, one optionally being an acrylate-grafted polymer resin. Coating agents made therefrom have a strong tendency to turn yellow. EP-A-0 391 271 describes aqueous coating agents containing a water-soluble polyester oligomer polyacrylate and amine resin cross-linking agents.

OBJECT OF THE INVENTION

The aim of the invention is to provide oligoester acrylate resins with a high content of solids and comparatively low viscosity, and aqueous coating agents with a low content of organic solvents for obtaining coatings with high resistance to chemicals, more particularly high resistance to acids and oily soot, and very low tendency to yellowing.

DETAILED DESCRIPTION OF THE INVENTION

It has been found that this problem can be solved by an aqueous coating composition which is one subject of the invention in the form of an emulsifier-free aqueous solution in which the resin component consists of:

A) 30 to 70 wt. % of a polyester oligomer polyacrylate dilutable with water after neutralisation with bases and obtained by radical polymerisation of 50 to 95 wt. % of one or more esters of unsaturated carboxylic acids with hydrophobic and hydrophilic components, in which a) the hydrophobic components are based on monomeric esters of unsaturated carboxylic acids with secondary OH groups, which can be present in a mixture with OH group-free comonomers, and b) the hydrophilic components are based on monomeric esters of unsaturated carboxylic acids with primary OH groups and unsaturated monomers with COOH groups, which can be mixed with OH group-free comonomers, the numerical proportion of primary to secondary OH groups originating from components b) and a) in the copolymer being 1 : 1.5 to 1 : 2.5, in 5 to 50 wt. % of one or more hydroxyfunctional polyester oligomers obtainable by polycondensation of diols and/or polyols and dicarboxylic acids and/or their derivatives, optionally with use of one or more monoalcohols and/or one or more monocarboxylic acids, with a calculated molecular weight of 200 to 1000, preferably 300 to 600, a hydroxyl number of 100 to 600, preferably 200 to 500, and an acid number of 0 to 15, preferably 0–1.5, the monomers a) and b) being used in quantities such that the resulting polyester oligomer polyacrylate has a hydroxyl number of 100 to 390, an acid number of 16 to 50, preferably 20 to 30, and a number average molecular weight (Mn) of 1 000 to 10 000, preferably 1 000 to under 3 000 (in each case the percentages by weight relate to the content of solids and add up to 100 wt. %), and B) 70 to 30 wt. %, preferably 60 to 40 wt. %, of one or more polyisocyanates, with free NCO groups, the percentages by weight of components A) and B) in each case relating to the content of solids in the resins and adding up to 100 wt. %, and the ratio of OH groups in component A) to NCO groups in component B) is about 0.5 : 1 to 2 : 1, preferably 0.8 : 1 to 1.2 : 1, and additionally contains water and optionally one or more organic solvents, pigments, fillers and/or conventional lacquer auxiliary substances and additives.

The binder component A) in the coating agent according to the invention can be obtained by polymerisation of components a) and b) in the polyester oligomer. For example, 95 to 50 parts by weight (relative to the solids in A)) of esters of unsaturated carboxylic acids with hydrophobic and hydrophilic components based on the previously defined components a) and b) can be polymerised in 5 to 50 parts by weight (relative to the solids in A)) of one hydroxyfunctional polyester oligomer as previously defined. The parts by weight of components a), b) and polyester oligomer add up to 100. The proportions of component b) and a) are chosen so that the numerical ratio of primary to secondary OH groups in the resulting copolymer (without allowing for the OH groups in the polyester oligomer) is 1 : 1.5 to 1 : 2.5.

The hydrophobic part a) of component A) of the coating agents according to the invention is obtained by copolymerisation of one or more esters of unsaturated carboxylic acids with an alcohol component containing at least one additional secondary hydroxyl group, in the presence of a polyester oligomer. The following are examples of unsaturated carboxylic acids of unsaturated ester monomers: (meth)acrylic acid (the term (Methacrylic) or (meth)acrylic here and hereinafter is used to stand for Methacrylic and/or Acrylic or methacrylic and/or acrylic), maleic acid or crotonic acid. The alcohol component of the ester monomers based on unsaturated carboxylic acids preferably contains 3 to 25 carbon atoms. They can be based on short-chain aliphatic alcohols, long-chain aliphatic alcohols or condensation products of alcohols or glycidyl compounds with fatty acids.

Hereinafter for simplicity, the self-emulsifying copolymers in component A) are also called acrylic copolymers. However, they are preferably based on monomers based on esters of (meth) acrylic acid; the simplifying expression includes the esters of other unsaturated carboxylic acids as previously defined.

The following are examples of the hydrophobic monomers with secondary OH groups:

Hydroxypropyl (meth) acrylate, adducts of glycidyl (meth)acrylate and saturated short-chain fatty acids with $C_1$–$C_3$ alkyl radicals, e.g. acetic acid or propionic acid, or adducts of Cardura E (glycidyl ester of versatic acid) with unsaturated COOH-functional compounds, such as acrylic or methacrylic acid, maleic acid or crotonic acid, or adducts of Cardura E with unsaturated anhydrides such as maleic acid anhydride, or reaction products of glycidyl (meth)acrylate with saturated branched or unbranched fatty acids with $C_4$–C20 alkyl radicals, such as butanoic acid, caproic acid, lauric acid, palmitic acid or stearic acid.

The hydrophilic part b) of component A) of the coating agent according to the invention is produced from monomers based on esters of unsaturated carboxylic acids such as (meth)acrylic acid, maleic acid or crotonic acid with at least one primary OH group in the alcohol part. The alcohol component of the unsaturated ester monomers can contain e.g. 2 to 18 carbon atoms.

The following are examples of the monomers for producing the hydrophilic part of component A):

Hydroxyalkyl esters of acrylic acid and/or methacrylic acid with one primary OH group and one $C_2$–$C_3$- hydroxyalkyl radical such as hydroxyethyl (meth) acrylate, or hydroxyalkyl esters of acrylic acid and/or methacrylic acid with one primary OH group and one $C_4$–C18 hydroxyalkyl radical such as butanediol monoacrylate, hydroxyhexyl acrylate, hydroxyoctyl acrylate or the corresponding methacrylates and reaction products of hydroxyethyl (meth) arylate with caprolactone.

The hydrophilic parts of component A) also contain carboxyl groups, which can be introduced during manufacture of component A) by using one or more carboxyl-functionalised monomers such as unsaturated monocarboxylic or dicarboxylic acids, e.g. acrylic acid, methacrylic acid or crotonic acid. Use can also be made of other carboxyl-functionalised monomers such as unsaturated anhydrides, e.g. maleic acid anhydride, or semiesters of dicarboxylic acids such as maleic acid anhydride by addition of unsaturated aliphatic alcohols such as ethanol, propanol, butanol and/or isobutanol.

Other comonomers free from OH groups can be used in the manufacture of component A). The following are examples: long-chain, branched or unbranched unsaturated monomers such as alkyl (meth)acrylates with $C_8$–$C_{18}$ chains in the alkyl part, e.g. ethyl hexyl (meth)acrylate, octyl (meth)acrylate, 3,5,5-trimethyl hexyl (meth) acrylate, decyl (meth)acrylate, dodecyl (meth)acrylate, hexadecyl (meth)acrylate, octadecyl (meth) acrylate, lauryl acrylate, isobornyl (meth)acrylate or 4-tertiary butyl cyclohexyl methacrylate. Other examples are short and medium-chain, branched or unbranched unsaturated monomers such as alkyl (meth)acrylates with $C_1$–$C_7$ chains in the alkyl part, e.g. methyl (meth)acrylate, ethyl (meth) acrylate, propyl (meth)acrylate, butyl (meth)acrylate, isobutyl (meth)acrylate, tertiary butyl (meth)acrylate, pentyl (meth)acrylate, hexyl (meth)acrylate or cyclohexyl (meth)acrylate. Another alternative is to use di- or triacrylates such as hexanediol diacrylate-1,6 or trimethylol propane triacrylate. Since the polymer branches in that case, it may be necessary to add a modifier such as mercaptoethanol. Aromatic vinyl compounds such as styrene or styrene derivatives such as vinyl toluene or p-methyl styrene can also be used as comonomers.

The quantities of comonomers used can be adjusted to obtain the desired parameters such as acid number, hydroxyl number and molecular weight.

As mentioned, the copolymers in component A) are manufactured by copolymerisation of components a) and b) in the presence of a polyester oligomer. The process is radical copolymerisation, in which the quantities of monomers and polyester oligomers are adjusted to obtain the desired specifications with regard to molecular weight, OH-group ratio, OH number and acid number.

Manufacture is preferably in the form of radical solution polymerisation in the presence of a polyester oligomer and a radical initiator as known to the person skilled in the art. The following are examples of radical initiators: dialkyl peroxides such as di-tert. butyl peroxide or di-cumyl peroxide; diacyl peroxides such as dibenzoyl peroxide or dilauryl peroxide; hydroperoxides such as cumene hydroperoxide or tert.butyl hydroperoxide; peresters such as tert.butyl perbenzoate, tert. butyl perpivalate, tert. butyl-per-3,5,5-trimethyl hexanoate or tert.butyl-per-2-ethyl hexanoate; peroxide dicarbonates such as di-2-ethyl hexyl peroxydicarbonate or dicyclohexyl peroxydicarbonate; perketals such as 1,1-bis-(tert.-butyl peroxy) 3,5,5-trimethyl cyclohexane or 1,1-bis-(tert.butyl)peroxy cyclohexane; ketone peroxides such as cyclohexane peroxide or methyl isobutyl ketone peroxide and azo compounds such as 2,2-azo-bis(2,4- dimethyl valeronitrile), 2,2'-azo-bis( 2-methylbutyronitrile), 1,1'-azo-bis-cyclohexane carbonitrile or azo-bis-isobutyronitrile.

The polymerisation initiators are generally used in a proportion of e.g. 0.1 to 4 wt. % relative to the amount of monomers.

Radical polymerisation can be brought about in a one-pot process to obtain a statistical distribution of hydrophobic and hydrophilic components.

For example, all the required monomers and the initiator or initiators can be mixed in a storage vessel, and then added during a period of e.g. 5 hours, to a mixture, heated e.g. to 140° C., of one or more solvents and polyester oligomers, or polyester oligomers alone, with agitation. The resulting copolymers will then have a statistical distribution of primary and secondary hydroxy and carboxy groups.

Another alternative is block polymerisation to obtain copolymers with hydrophobic and hydrophilic blocks. The block copolymers can be produced in conventional manner. Firstly, for example, mixtures of hydrophobic monomers (optionally together with other comonomers) can be polymerised, followed by addition of hydrophilic monomers (optionally with copolymers) and further polymerisation. In practice, for example, a mixture of hydrophobic, hydroxy-functional monomers (meth) acrylic acid esters and optionally vinyl aromatics can first be added, followed by a further mixture of hydrophilic hydroxyfunctional monomers, (meth)acrylic acid esters, vinyl aromatics and COOH-functional monomers. The resulting copolymers will then have one hydrophobic and one hydrophilic end of the chain, and can thus e.g. serve as emulsifiers. Alternatively of course the individual monomers can be added separately, optionally staggered in time.

Copolymerisation of components a) and b) in the presence of polyester oligomers in the manufacture of component A) is a means of greatly reducing the amount of solvent, which has to be added and may subsequently have to be removed by distillation. It is even possible to avoid solvents completely and use the polyester oligomers alone as solvents in the manufacture of component A).

The polyester oligomers used in the manufacture of component A) can be produced e.g. from one or more diols and/or polyols, optionally in the presence of one or more monoalcohols, by condensation with one or more dicarboxylic acids and/or derivatives thereof. Polycondensation is brought about by conventional methods familiar to the person skilled in the art, e.g. in the presence of conventional esterification catalysts and optionally at elevated temperatures of e.g. 180° to 230° C. in the melt.

The polyester oligomers are preferably prepared from aliphatic and/or cycloaliphatic starting compounds (alcohols and acids) and are particularly preferred for . . . by aromatic components.

The polyols can e.g. contain more than two OH groups, e.g. aliphatic triols and tetrols with 2 to 6 carbon atoms, such as trimethylol ethane, trimethylol propane, glycerol, 1,2,4-butanetriol, 1,2,6-hexanetriol or pentaerythritol.

Alternatively use can be made of one or more monofunctional alcohols such as monoalkanols with branched or unbranched alkyl radicals containing e.g. 1 to 20 carbon atoms, e.g. methanol, ethanol, propanol, isopropanol, lauryl alcohol or stearyl alcohol.

The dicarboxylic acids can be aliphatic saturated or unsaturated dicarboxylic acids such as maleic acid, fumaric acid, succinic acid, adipic acid, azelaic acid or sebacic acid, or cycloaliphatic saturated or unsaturated dicarboxylic acids and aromatic dicarboxylic acids such as phthalic acid, isophthalic acid, tetra-, hexa-, endomethylene tetrahydrophthalic acid, endoethylene tetrahydrophthalic acid or cyclohexane dicarboxylic acid (1,2; 1,3 and 1,4), itaconic acid, muconic acid or camphoric acid or anhydrides thereof, if they exist.

Another alternative is to use monofunctional carboxylic acids such as acetic acid, propionic acid, lauryl acid or stearyl acid.

The following are examples of usable diols: aliphatic diols such as ethylene glycol, propylene glycol-(1,3 and 1,2), butanediol, hexanediol-(1,6), neopentyl glycol, 2-butyl-2 -ethyl-propanediol-1,3; polyether glycols of ethylene and propylene with up to 6 monomer units, such as diethylene glycol, triethylene glycol, tetraethylene glycol and hexaethylene glycol; or cycloaliphatic diols such as 1,3-dimethylol cyclo-hexane and 1,4-dimethylol cyclohexane.

The coating agents according to the invention contain one or more polyisocyanates as the cross-linking agent (component B)). The polyisocyanates contain free, i.e. unmasked isocyanate groups (NCO groups). The following are examples of usable polyisocyanates: cycloaliphatic, aliphatic or aromatic polyisocyanates such as tetramethylene diisocyanate, hexamethylene diisocyanate, 2,2,4-trimethylene diisocyanate, 1,12-dodecane diisocyanate, cyclohexane-1,3- and 1,4- diisocyanate, 1-isocyanto-3,3,5-trimethyl-5-isocyanato-methyl cyclohexane (=isophorone diisocyanate IPDI), perhydro-2,4'-and/or-4,4'-diphenyl methane diisocyanate, 1,3- and 1,4-phenylene diisocyanate, 2,4- and 2,6- toluylene diisocyanate, diphenyl methane-2,4'- and/or -4,4'-diisocyanate, 3,2' and/or 3,4-diisocyanato-4-methyl diphenyl methane, naphthylene-1,5-diisocyanate, triphenyl methane-4,4'-triisocyanate, tetramethyl xylylene diisocyanate or mixtures of these compounds.

Use may also be made of copolymers of the vinyl-unsaturated monoisocyanate, dimethyl-m-isopropenyl benzyl isocyanate, as described inter alia in DE-A 41 37 615.

In addition to these simple isocyanates, use can be made of substances containing heteroatoms in the radical linking the isocyanate groups. The following are examples: polyisocyanates containing carbodiimide groups, allophanate groups, isocyanurate groups, urethane groups, acylated urea groups and biuret groups.

The following are particularly suitable for the invention: the known polyisocyanates which are the main substances used in the manufacture of lacquers, e.g. biuret, isocyanurate or urethane group-containing modified products of the aforementioned simple polyisocyanates, particularly tris-(6-isocyanatohexyl) biuret or low-molecular urethane group-containing polyisocyanates as obtainable by reaction of excess IPDI with simple polyhydric alcohols having a molecular weight range of 62–300, more particularly trimethylol propane. Of course, any mixtures of the aforementioned polyisocyanates can also be used to produce the substances according to the invention.

The polyisocyanates can also be known prepolymers containing terminal isocyanate groups, as obtainable particularly by the action of the aforementioned simple polyisocyanates, particularly diisocyanates, with excess quantities of organic compounds containing at least two groups capable of reacting with isocyanate groups. The preferred substances are compounds containing a total of at least two amino groups and/or hydroxyl groups and with a number average molecular weight of 300 to 10 000, preferably 400 to 6 000.

In these known prepolymers, the ratio of isocyanate groups to hydrogen atoms capable of reacting with NCO is preferably 1.05 to 10 : 1, particularly preferably 1.1 to 3 : 1, the hydrogen atoms preferably originating from hydroxyl groups.

The nature and proportions of the starting materials used in manufacturing NCO prepolymers are preferably chosen so that the NCO prepolymers having a) an average NCO functionality of 2 to 4, preferably 2 to 3 and b) a number average molecular weight of 500–10000, preferably 800–4000.

Another alternative is to use polyisocyanates which are hydrophilically modified as described e.g. in EP-A-0 206 059, EP-A-0 061 628, EP-A-0 310 345 or EP-A-0 019 844.

The coating agents according to the invention can contain conventional lacquer solvents in proportions of e.g. up to 20 wt. %, e.g. 5 to 20 wt. %. The solvents can e.g. be organic solvents such as aliphatic or aromatic hydrocarbons, e.g. toluene, xylenes, mixtures of aliphatic and/or aromatic hydrocarbons or esters, ethers and alcohols.

The coating agents can be manufactured with conventional additives (e.g. pigments, fillers, auxiliary substances and additives), as conventionally in the lacquer sector. The quantities are within the normal range familiar to the person skilled in the art.

The additives can e.g. be pigments, e.g. colouring pigments such as titanium dioxide or carbon black, and decorative pigments such as metal-flake pigments and/or nacreous pigments. The binder compositions prepared according to the invention are particularly suitable for coating agents containing such decorative pigments. Preferably they contain decorative pigments together with colouring pigments, or colouring pigments together with fillers. Other examples of additives are conventional lacquer fillers such as talc or silicates and additives and adjuvants such as plasticisers, light-excluding agents, stabilisers and levelling agents, such as silicone oils and catalysts. These are likewise added in normal quantities, familiar to the person skilled in the art.

The aqueous emulsions can be prepared by conventional methods familiar to the person skilled in the art.

In practice, for example, a solvent-containing polyester acrylic oligomer is optionally substantially freed from solvents, preferably by distillation at reduced pressure. Next, the resin is partly or completely neutralised with bases. Use can be made of conventional lacquer bases such as ammonia or tertiary amines such as triethylamine, dimethyl ethanolamine or triethanolamine. Neutralisation can e.g. be by slow addition of bases, e.g. for 5 minutes.

Next, completely demineralised water is poured into the hot resin mixture, e.g. in 60 to 90 minutes and with vigorous agitation. The dispersion can be assisted by heating the water phase. The mixing units can e.g. be high-speed agitators or rotor/stator mixers. Alternatively the dispersion can be improved by high-pressure or ultrasonic homogenisers. The process can be continuous or discontinuous. The product is an aqueous oil-in-water emulsion which is stable in storage and Can without difficulty be adjusted with water to obtain a lower content of solids suitable for application. Pigments, fillers and other additives can be added as required, during and/or after manufacture of the emulsion.

Alternatively the polyester oligomer acrylate can be partly or completely neutralised with bases and emulsified with sufficient water to produce a water-in-oil emulsion. The water-in-oil emulsion can then be stored, then mixed with additives and cross-linking agents to produce the coating agent (lacquer production) and adjusted with water or solvent-water mixtures to the viscosity required for application. The advantage of this method is that additives and cross-linking agents enter the resin phase directly, instead of entering the aqueous phase, which is often undesirable.

The resulting aqueous emulsions have e.g. an HS value of 80 to 90. They can e.g. have a solids range of 25 to 55 wt. % relative to the finished dispersion. They can be diluted with water, e.g. to a suitable spray viscosity for application.

The binder compositions according to the invention are "two-component" systems, i.e. components A) and B) are stored separately and not mixed with the coating agents until just before or during application, e.g. for producing coating agents. The binder compositions according to the invention can be formulated in conventional manner to obtain coating agents, e.g. lacquers. This is usually done by adding solvents or water. A mixture of component A) also containing component B) can be prepared and processed in conventional manner by adding solvents or water and conventional additives to obtain coating agents. Another alternative is first to prepare component A) by adding water and/or solvents and conventional additives and then add the other component B).

Components A) and B) are used in proportions such that the ratio of OH groups in component A) to NCO groups in component B) is about 0.5 : 1 to 2 : 1.

The coating agents according to the invention can contain water and co-solvents. These are for adjusting the viscosity during application or for influencing the film-forming properties or for obtaining specific lacquer effects. The solvents can e.g. be aromatic hydrocarbons such as xylenes or aliphatic hydrocarbons such as n-hexane or cyclohexane, or ketones such as acetone or methyl isopropyl ketone, or esters such as butyl acetate or ethyl acetate, or ethers such as methoxypropanol or butoxypropanol. Alternatively use can be made of alcohols such as isopropanol, hexanol or ethyl glycol. The application and film-forming properties can be influenced via the boiling-point or by varying the dissolving capacity of the solvent. The amount of solvent added will therefore depend on the desired properties, more particularly the viscosity, of the coating agents. When water is used as the solvent, true solutions, emulsions or dispersions are obtained. Aqueous solvents have a particularly low content of volatile organic constituents.

The coating agents produced from the binders according to the invention can be adjusted to the desired application viscosity by suitably adjusting the amount of water and/or additives.

The coating agents according to the invention are suitable for coatings which adhere to a number of substrates, such as wood, textiles, plastics, glass, ceramics and particularly metal. The coating agent according to the invention is also of use as an adhesive.

The coating agent according to the invention is applied by known methods such as spraying, immersion, rolling or by doctor blade. The coating agent is applied to the substrate, optionally after other lacquer layers have already been applied. After an evaporation phase, the applied coating agent can be cross-linked by heating. The stoving temperatures are e.g. about 5° to 150° C., preferably about 20° to 80° C. The thickness of the film after setting is about 15 to 50 μm. The result is a cross-linked, hard, glossy acid-resistant lacquer coating.

Cross-linking can optionally be catalysed, by using conventional lacquer catalysts in conventional quantities, such as dibutyl tin dilaurate or suitable bismuth compounds.

One preferred embodiment is use of the coating agent according to the invention as a clear lacquer coating on a base lacquer, preferably an aqueous base lacquer. Application can be wet-on-wet, or the base lacquer is first dried by heating. This results in particularly good adhesion between the two layers.

The coating agents according to the invention, formulated as clear lacquers free from pigment, can e.g. be used to cover base lacquers which can contain conventional coating-lacquer pigments; preferably they contain decorative pigments such as metallic pigments. The binder base of the base lacquer preferably comprises polyester, polyurethane or acrylate resins. These binders can optionally be cross-linked by cross-linking agents such as melamine or isocyanate derivatives.

The following are some examples of other base lacquers, which can preferably be coated with pigment-free clear or pigment-containing coating lacquers prepared pigment-free according to the invention:

Water-based lacquers based on 50 to 95 wt. % of an aqueous epoxy-functionalised emulsion polymer and 95 to 5 wt. % of an anionic polyurethane dispersion with an acid number of 5 to 10. The pigments and additives used as paste resins in these water-based lacquers can particularly be poly(meth)acrylate resins (e.g. in a proportion of up to 20 wt. %). Examples of these water-based lacquers are described in DE-OS 3 628 124.

Base lacquers on the basis of polyesters with a glass transition temperature of >30%, melamine resins (e.g. partially butylated melamine resins), polyurea plasticisers (e.g. based on an adduct of butyl urethane and formaldehyde) and a copolymer of polyethylene (85 wt. %) and vinyl acetate (15 wt. %) in the form of a wax dispersion. These base lacquers can contain conventional additives such as cellulose acetobutyrate (e.g. with various molecular weight ranges). Examples of these base lacquers are described in EP-A-187 379.

One example of solvent-based base lacquers particularly suitable for repair work contains physically drying binders based on thermoplastic polyester and/or acrylic resin mixed with cellulose ethers or cellulose esters and/or polyvinyl acetates. Other constituents are self-hardening acrylic resin binders which contain colour pigments and hydrogen atoms capable of reacting with isocyanate, and mixtures of cellulose ethers and/or cellulose esters and/or cellulose semiesters dissolved in solvents. Such lacquers are described e.g. in DE-OS-29 24 632.

All the preceding base lacquer formulations can contain conventional lacquer additives, conventional fillers and colouring pigments and metallic pigments such as aluminium or stainless-steel bronze and other decorative pigments.

Powder lacquers as described e.g. in "Products Finishing" April 1978, pages 54 to 56, are other examples of base lacquers which can be coated with clear lacquers based on coating agents according to the invention.

Other base lacquers are described in DE-A 42 28 510.

The coating agents according to the invention can also be formulated as base lacquers or as fillers. In that case they are particularly suitable for production of multilayer lacquer coats, e.g. in the motor-vehicle sector. Conventional additives, such as described e.g. for base lacquers hereinbefore, can be added to the formulation as base lacquers or fillers.

Compared with conventional base lacquers, base lacquers according to the invention provide coatings with improved resistance to hot moisture, due to the particularly good cross-linking effect.

The base lacquers according to the invention can be covered with conventional clear lacquers wet-on-wet, optionally after brief drying. Preferably they are covered with clear lacquers based on coating agents according to the invention.

The coating agents according to the invention are particularly suitable for coating lacquers or clear lacquers and base lacquers of use preferably in the motor-vehicle sector and also in other sectors. Use of the coating agent according to the invention in multilayer lacquering is particularly suitable for cars, but can also serve for other purposes, e.g. for household appliances or in the furniture industry, to obtain particularly acid-resistant coatings.

In the following examples, parts (German abbreviation T) and percentages are by weight.

EXAMPLE 1

Manufacture of a polyester oligomer 336.7 trimethylol propane, 356.8 adipic acid and 197 g hexanediol were esterified to an acid number of 20 with 5 g hypophosphorous acid in a 2-liter 3-necked flask equipped with agitator, separator, thermometer and reflux condenser at 180° to 230° C. in the melt.

The mixture was then condensed in vacuo to an acid number below 1.5.

The resulting substance had a stoving residue of 94.5% (1 hour at 150° C.), a viscosity of 3200 mPas (100%), a hydroxyl number of 460 and a colour number of 30 Hazen.

EXAMPLE 2

| Production of a polyester oligomer acrylate resin | |
|---|---|
| 505.6 g | butyl diglycol |
| 561.8 g | polyester oligomer in Example 1 and |
| 1421.4 g | glycidyl ester of versatic acid (trade name of Shell AG "Cardura E10) | were heated to 144° C. with agitation in a 6-liter 4-necked flask equipped with agitator, reflux condenser, dropping funnel and thermometer. Next, a mixture of

| | |
|---|---|
| 196.7 g | lauryl acrylate |
| 196.7 g | styrene |
| 393.3 g | isobutyl acrylate |
| 398.9 g | butanediol monoacrylate |
| 556.2 g | acrylic acid |
| 612.4 g | isobutyl methacrylate |

| | -continued |
|---|---|
| 22.5 g | di-tertiary butyl peroxide and |
| 134.9 g | tertiary butyl peroctoate | were added in 5 hours. Polymerisation was continued for a further 2 hours at 144° C. The resin had a solids content of 88.3% (1 hour at 150° C.), an acid number of 26 mg KOH/g and a viscosity of 7600 mPas.

EXAMPLE 3

Production of an aqueous polyester oligomer acrylate emulsion 634 g of the polyester oligomer acrylate described in Example 2 was heated to 40° C. with agitation in a 2-liter 3-necked flask equipped with agitator, thermometer and dropping funnel. The mixture was then neutralised by adding 15.8 g dimethyl ethanolamine. 350.2 g completely demineralised water was added with agitation during 30 minutes. The resulting emulsion had a solids content of 55.1% (1 hour at 120° C.).

EXAMPLE 4

Production of a 2K water-white clear lacquer 82 parts of the polyester oligomer acrylate emulsions produced in 3 was mixed with 18 parts of Solvesso 100. 100 parts of the mixture were mixed with 35 parts of an 80% solution of the isocyanurate of hexamethylene diisocyanate in Solvesso 100. The clear lacquer was applied in a dry in Solvesso 100. The clear lacquer was applied in a dry film thickness of about 35 μm, using a doctor blade, and after exposure to air for 10 minutes at room temperature, was stoved at 80° C. for 60 minutes. The result was a clear hard film with good technological properties.

I claim:

1. An emulsifier-free thermosettable coating agent in the form of an aqueous emulsion in which the resin component consists of:

A) 30 to 70 wt. % of a polyester oligomer polyacrylate dilutable with water after neutralisation with bases and obtainable by radical polymerisation of 50 to 95 wt. % of one or more esters of unsaturated carboxylic acids with hydrophobic and hydrophilic components, in which a) the hydrophobic components are based on monomeric esters of unsaturated carboxylic acids with secondary OH groups, which can be present in a mixture with comonomers free from OH groups, and b) the hydrophilic components are based on monomeric esters of unsaturated carboxylic acids with primary OH groups and unsaturated monomers with COOH groups, which can be present in a mixture with comonomers free from OH groups, and the numerical ratio of primary to secondary OH groups originating from components b) and a) in the copolymer is 1 : 1.5 to 1 : 2.5, in 5 to 50 wt. % of one or more hydroxyfunctional polyester oligomers obtainable by polycondensation of one or more diols and/or polyols and one or more dicarboxylic acids and/or semiesters of dicarboxylic acids, optionally with use of one or more monoalcohols and/or one or more monocarboxylic acids, with a calculated molecular weight of 200 to 1000, a hydroxyl number of 100 to 600 and an acid number of 0 to 15, the monomers a) and b) being added in quantities such that the polyester oligomer polyacrylate has a hydroxyl number of 100 to 390, an acid number of 16 to 50 and a number average molecular weight (Mn) of 1000 to 10 000, and the percentages by weight in each case relating to the content of solids and adding up to 100 wt. %; and B) 70 to 30 wt. % of one or more polyisocyanates with free NCO groups, the percentages by weight of components A) and B) in each case relating to the solids content of the resins and adding up to 100 wt. %, and the ratio of OH groups in component A) to free NCO groups in component B) being between 0.5 : 1 and 2 : 1, and additionally containing water and optionally one or more organic solvents, pigments, fillers and/or conventional lacquer auxiliary substances and additives.

2. A coating agent according to claim 1, in which the component B) comprises two or more different polyisocyanates.

3. A method of producing the coating agents according to claim 1, characterised in that A) 95 to 50 wt. % of one or more esters of unsaturated carboxylic acids with hydrophobic and hydrophilic components, in which a) the hydrophobic components are based on monomeric esters of unsaturated carboxylic acids with secondary OH groups and optionally present in a mixture with OH group-free comonomers, and b) the hydrophilic components are based on monomeric esters of unsaturated carboxylic acids with primary OH groups and monomeric esters of unsaturated carboxylic acids with COOH groups, which may be mixed with OH group-free comonomers, are radically polymerised in the presence of 5 to 50 parts by weight of one or more hydroxyfunctional polyester oligomers obtainable by polycondensation of one or more diols and/or polyols with one or more dicarboxylic acids and/or semiesters of dicarbozylic acid, with a calculated molecular weight of 200 to 1000, a hydroxyl number of 100 to 600 and an acid number of 0 to 15, the monomers a) and b) being used in quantities such that the resulting polyester oligomer polyacrylate has a hydroxyl number of 100 to 390, an acid number of 16 to 50 and a number average molecular weight (Mn) of 1 000 to 10 000, and the numerical ratio of primary to secondary OH groups (originating from components b) and a) without allowing for the OH groups in the polyester oligomer) is 1 : 1.5 to 1 : 2.5, the parts by weight in each case relating to the weight of solids and adding up to 100 parts by weight, after which 30 to 70 wt. % of the resulting component A) before or after neutralisation and immediately before use of the coating agent, are mixed with B) 70 to 30 wt. % of one or more polyisocyanates with free NCO groups, in proportions such that the ratio of OH groups in component A) to free NCO groups in component B) is 0.5 : 1 to 2 : 1, and water and optionally one or more organic solvents, pigments, fillers and/or conventional lacquer auxiliary substances and additives are added to component A) and/or B) or mixtures thereof, optionally after neutralisation.

4. A coating agent according to claim 1, characterised in that the polyester oligomer polyacrylate in component A) has a number average molecular weight (Mn) of 1000 to under 3000.

5. A coating agent according to claim 1 additionally containing a pigment.

6. A coating agent according to claim 1 which does not contain a pigment.

* * * * *